US009213978B2

(12) United States Patent
Melamed et al.

(10) Patent No.: US 9,213,978 B2
(45) Date of Patent: Dec. 15, 2015

(54) SYSTEM AND METHOD FOR SPEECH TREND ANALYTICS WITH OBJECTIVE FUNCTION AND FEATURE CONSTRAINTS

(75) Inventors: Ilya Dan Melamed, New York, NY (US); Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 723 days.

(21) Appl. No.: 12/895,337

(22) Filed: Sep. 30, 2010

(65) Prior Publication Data

US 2012/0084081 A1    Apr. 5, 2012

(51) Int. Cl.
 G10L 25/27  (2013.01)
 G10L 25/72  (2013.01)
 G06Q 30/00  (2012.01)
 G06F 17/30  (2006.01)

(52) U.S. Cl.
 CPC .......... *G06Q 30/01* (2013.01); *G06F 17/30684* (2013.01)

(58) Field of Classification Search
 CPC ......... G10L 25/27; G10L 25/39; G10L 25/48; G10L 25/51; G10L 25/72; H04M 3/4217; H04M 3/5175; G06F 17/30663
 USPC .......... 704/231, 235, 236, 251, 270; 379/265.06, 266.1; 706/12, 13, 19
 See application file for complete search history.

(56) References Cited

U.S. PATENT DOCUMENTS

| | | | |
|---|---|---|---|
| 6,263,049 B1 * | 7/2001 | Kuhn | 379/32.01 |
| 7,076,427 B2 * | 7/2006 | Scarano et al. | 704/270 |
| 7,096,209 B2 * | 8/2006 | Liu et al. | 706/19 |
| 7,574,422 B2 * | 8/2009 | Guan et al. | |
| 7,788,095 B2 * | 8/2010 | Wasserblant et al. | 704/251 |
| 7,809,127 B2 * | 10/2010 | Hackbarth et al. | 379/265.01 |
| 7,881,216 B2 * | 2/2011 | Blair | 370/252 |
| 8,204,884 B2 * | 6/2012 | Freedman et al. | 707/737 |
| 8,756,065 B2 * | 6/2014 | Melamed et al. | 704/270.1 |
| 8,918,396 B2 * | 12/2014 | Nagano et al. | 707/737 |
| 2003/0033194 A1 * | 2/2003 | Ferguson et al. | 705/10 |
| 2005/0065837 A1 * | 3/2005 | Kosiba et al. | 705/9 |
| 2005/0144149 A1 * | 6/2005 | Li et al. | 706/12 |

(Continued)

OTHER PUBLICATIONS

Busso C, Lee S and Narayanan S, Analysis of emotionally salient aspects of fundamental frequency for emotion detection, IEEE Transactions on Audio, Speech & Language Processing 17(4), 582-596, 2009.

(Continued)

*Primary Examiner* — Martin Lerner (57) ABSTRACT

Disclosed herein are systems, methods, and non-transitory computer-readable storage media for performing trend analysis of speech. A system practicing the method receives a speech trend analysis request having candidate feature constraints, an objective function with respect to a speech trend to be analyzed, and a set of speech record constraints. The system selects a subset of speech records from the group of speech records based on the set of speech record constraints to yield selected speech records, identifies features in the selected speech records based on the set of candidate feature constraints to yield identified features, and assigns a weight to each of the identified features based on the objective function. Then the system ranks the identified features by their respective weights to yield ranked identified features, and outputs at least one of the ranked identified features associated with a speech-based trend in response to the speech trend analysis request.

19 Claims, 5 Drawing Sheets

(56) References Cited

U.S. PATENT DOCUMENTS

| | | | |
|---|---|---|---|
| 2007/0195944 A1* | 8/2007 | Korenblit et al. | 379/265.06 |
| 2009/0048991 A1* | 2/2009 | Kobayashi | 706/13 |
| 2009/0204234 A1* | 8/2009 | Sustaeta et al. | 700/29 |
| 2009/0290700 A1* | 11/2009 | Omiya | 379/201.02 |
| 2010/0274637 A1* | 10/2010 | Li et al. | 705/11 |
| 2010/0324894 A1* | 12/2010 | Potkonjak | 704/235 |
| 2011/0295774 A1* | 12/2011 | Chen et al. | 706/12 |
| 2014/0032217 A1* | 1/2014 | Deligne et al. | 704/257 |
| 2014/0219436 A1* | 8/2014 | Kosiba et al. | 379/265.02 |

OTHER PUBLICATIONS

Camelin N, Bechet F, Damnati G, Mori RD, 2009a, Speech mining in noisy audio message corpus, Proceedings of Interspeech 2007.

Camelin N, Bechet F, Damnati G, Mori RD 2010, Detection and interpretation of opinion expressions in spoken surveys. IEEE Transactions on Speech and Audio Processing. vol. 18, No. 2, Feb. 2010.

Camelin N, Damnati G, Bechet F, Mori RD 2009b, Automatic customer feedback processing: alarm detection in open question spoken messages, Proceedings of Interspeech 2008.

Camelin N, Mori RD, Bechet F, Damnati G 2009c, Error correction of proportions in spoken opinion surveys, Proceedings of Interspeech, Sep. 6-10, 2009, Brighton UK.

Chelba C, Hazen TJ, Saraclar M, Retrieval & browsing of spoken content, IEEE Signal Processing Magazine 25, 39-49, 2008.

Cooper JW, Viswanathan M, Kazi Z 2001 Samsa: A speech analysis, mining and summary application for outbound telephone calls, Proceedings of the 34th Hawaii International Conference on System Sciences.

Cutler A, Pearson M, 1985, On the analysis of prosodic turn-taking cues, in Intonation in Disclosure (ed, Johns-Lewis C) Croom Helm, pp. 139-155.

Date CJ 1989, A note on the relational calculus. SIGMOD Record 18(4), 12-16.

Douglas S, Agarwal D, Alonso T, Bell RM, Gilbert M, Swayne DF, Volinsy C, 2005, Mining customer care dialogs for "daily news". IEEE Transactions on Speech and Audio Processing 13(5-1), 652-660.

Gustafsson F, 2000, Adaptive filtering and change detection. Copyright © 2000 John Wiley & Sons, Ltd ISBNs: 0-471-49287-6 (Hardback); 0-470-84161-3 (Electronic).

Lee CM, Narayanan SS, Toward detecting emotions in spoken dialogs. Speech and Audio Processing, IEEE Transactions on 13(@), 293-303, 2005.

Mamou J, Ramabhadran B, Phonetic query expansion for spoken document retrieval, Proceedings of Interspeech, 2008.

Mamou J, Carmel D, Hoory R, Spoken document retrieval from call-center conversations, Proceedings of SIGIR, Aug. 6-11, 2006, Seattle, Washington.

Melamed ID, Kim YJ, Automatic detection of audio advertisements, Proceedings of Interspeech, 2009.

Park Y, Automatic call section segmentation for contact-center calls, in CIKM (Ed. Silva MJ, Laender AHF, Baeza-Yates RA, McGuinness DL, Olstad B, Olsen OH, Falcao AO), pp. 117-126, ACM, 2007.

Pearl J, Causal inference in statistics: An overvies, Statistics Surveys 3, 96-146, 2009.

Polzehl T, Metze F, Using prosodic features to prioritize voice messages SSCS Workshop and SIGIR, 2008.

Schapire RE, A brief introduction to boosting, Proceedings of the Sixteenth International Joint Conference on Artificial Intelligence, 1999.

Shichiri T, Nanjo H, Yoshimi T, Minimum bayes-risk decoding with presumed word significance for speech based information retrieval, IEEE International Conference on Acoustics, Speech, and Signal Processing (ICASSP 2008), pp. 1557-1560.

Takeuchi H, Subramaniam LV, Nasukawa T, Roy S, Balakrishnan S, A conversation-mining system for gathering insights to improve agent productivity, CEC/EEE, pp. 465-468, IEEE Computer Society, 2007.

Tibshirani R, Regression shrinkage and selection via the lasso, Journal of the Royal Statistical Society, Series B (Methodological), vol. 58, No. 1, 267-288, University o Toronto, Canada, 1994.

Ukkonen E, On-line construction of suffix trees, Algorithmica 14(3), 249-260, 1995.

Zweig G, Siohan O, Saon G, Ramabhadran B, Povey D, Mangu L, Kingsbury B, Automated quality monitoring for call centers using speech and nlp technologies, Proceedings of the Human Language Technology, Conference of the NAACL, Companion Volume: Demonstations, pp. 292-295, Association for Computational Lingustics, New York city, USA, 2006.

* cited by examiner

SYSTEM AND METHOD FOR SPEECH TREND ANALYTICS WITH OBJECTIVE FUNCTION AND FEATURE CONSTRAINTS

BACKGROUND

1. Technical Field

The present disclosure relates to speech analytics and more specifically to a flexible, adaptive approach to speech analytics.

2. Introduction

Speech analytics is a form of speech data mining beyond mere transcription and voice search. One working definition of speech analytics is the synthesis of actionable information from multiple conversations, such as a real-time or recorded set of conversations between call center employees and customers. Current approaches to speech analytics include packages that analyze speech with a single task or problem in mind. Thus, analysts must use a patchwork of different tools and guesswork every time they have a new analytics problem.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The architecture and approaches disclosed herein enable an analyst to solve many analytics problems intuitively and directly, for which separate systems were required in the past. One common application of speech analytics is in customer service call centers, but other applications include emergency services hotlines, crisis intervention centers, polling organizations, and outbound telephone survey companies. This system makes analysts' jobs easier and more effective by using a uniform representation for a large class of analytics problems together with an intuitive user interface. A speech analytics system is only as useful as an analyst's ability to understand, navigate, and control the system.

Speech analytics is one way to gather business intelligence from large data sets of speech. The speech can be any set of speech, such as conversations between two or more speakers, between one speaker and an interactive voice response (or other automated) system, or a monologue such as a classroom lecture. Organizations can use such intelligence generated from speech analytics to cut costs, discover sales opportunities, improve marketing campaigns, and so forth. One specific example of how speech analytics in call centers can be valuable is discovering ways to improve customer service based on customer satisfaction surveys, such as by coaching service agents. Other examples include discovering ways to reduce average call handling time thereby reducing labor costs, discovering conversation patterns correlated with upselling/cross-selling or lack thereof, predicting product demand for inventory planning such as calls to a department store asking "Do you carry Product X?", and discovering problems that many customers are calling about in order to reduce call volume by preemptively solving those problems. Many other applications of speech analytics exist besides these examples.

Disclosed are systems, methods, and non-transitory computer-readable storage media for performing speech trend analysis. A system performing the method first receives, as part of a speech trend analysis request, a set of candidate feature constraints, an objective function with respect to a speech trend to be analyzed, and a set of speech record constraints to be applied to a group of speech records. Then the system selects a subset of speech records from the group of speech records based on the set of speech record constraints to yield selected speech records, and identifies features in the selected speech records based on the set of candidate feature constraints to yield identified features. The system can further assign a weight to each of the identified features based on the objective function, rank the identified features by their respective weights to yield ranked identified features, and output at least one of the ranked identified features associated with a speech-based trend in response to the speech trend analysis request.

Also disclosed are systems, methods, and non-transitory computer-readable storage media for generating an alert based on speech analytics data. A system practicing this method first generates elements of a time series. Each element can include speech records having timestamps within a same time interval. The system then generates a numeric value for each element in the time series based on a weight for each speech record, an objective function with respect to a trend to be analyzed, and a set of record constraints to be applied to a group of records. The system then generates an alarm when at least one respective numeric value for at least one element in the time series meets a threshold.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more flexible, adaptive, and extensible speech analytics systems. A brief discussion of a basic general-purpose system or computing device in FIG. 1, which can be employed to practice the concepts, is disclosed herein. The disclosure then turns to a discussion of a general system architecture of an exemplary speech analytics system and its various components and user interfaces. The disclosure then turns to a discussion of trend analysis and an alerting system. Finally, the disclosure turns to a more detailed description of the exemplary method. The disclosure now turns to the exemplary computing system of FIG. 1.

Figure 1:
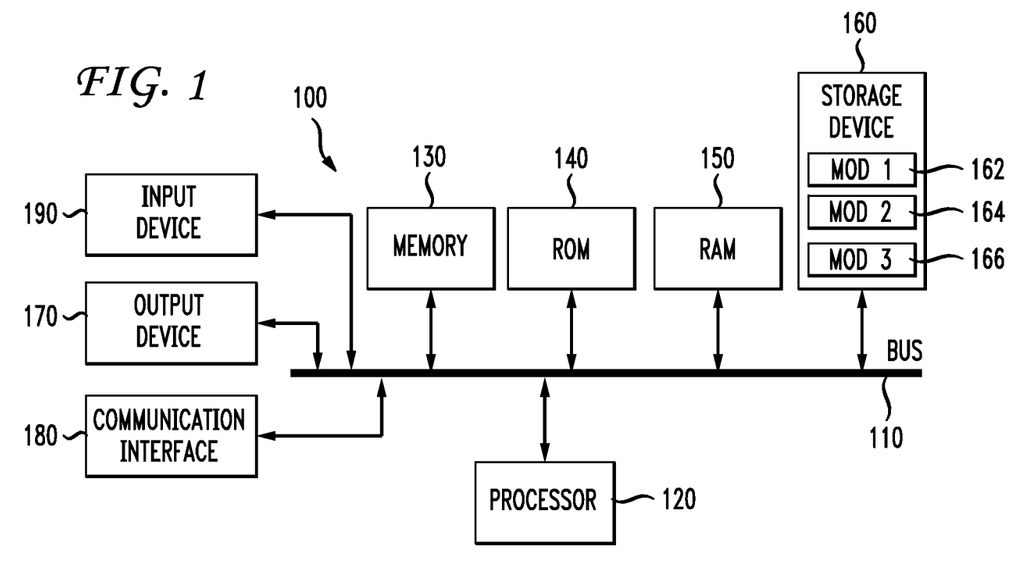
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic components of an exemplary computing device, the disclosure returns to speech analytics. One working definition of speech analytics, as described above, is the synthesis of actionable information from multiple conversations, such as a real-time or recorded set of conversations between call center employees and customers.

What constitutes actionable information varies from application to application. A speech analytics system can also provide for speech retrieval and browsing. For example, a speech retrieval system can help an analyst find conversations where certain words occur in a speech database, and browse to and play back a particular part of the conversation where those words occur. This functionality can save the analyst inestimable hours of listening to irrelevant conversations as well as irrelevant parts of relevant conversations.

Figure 2:
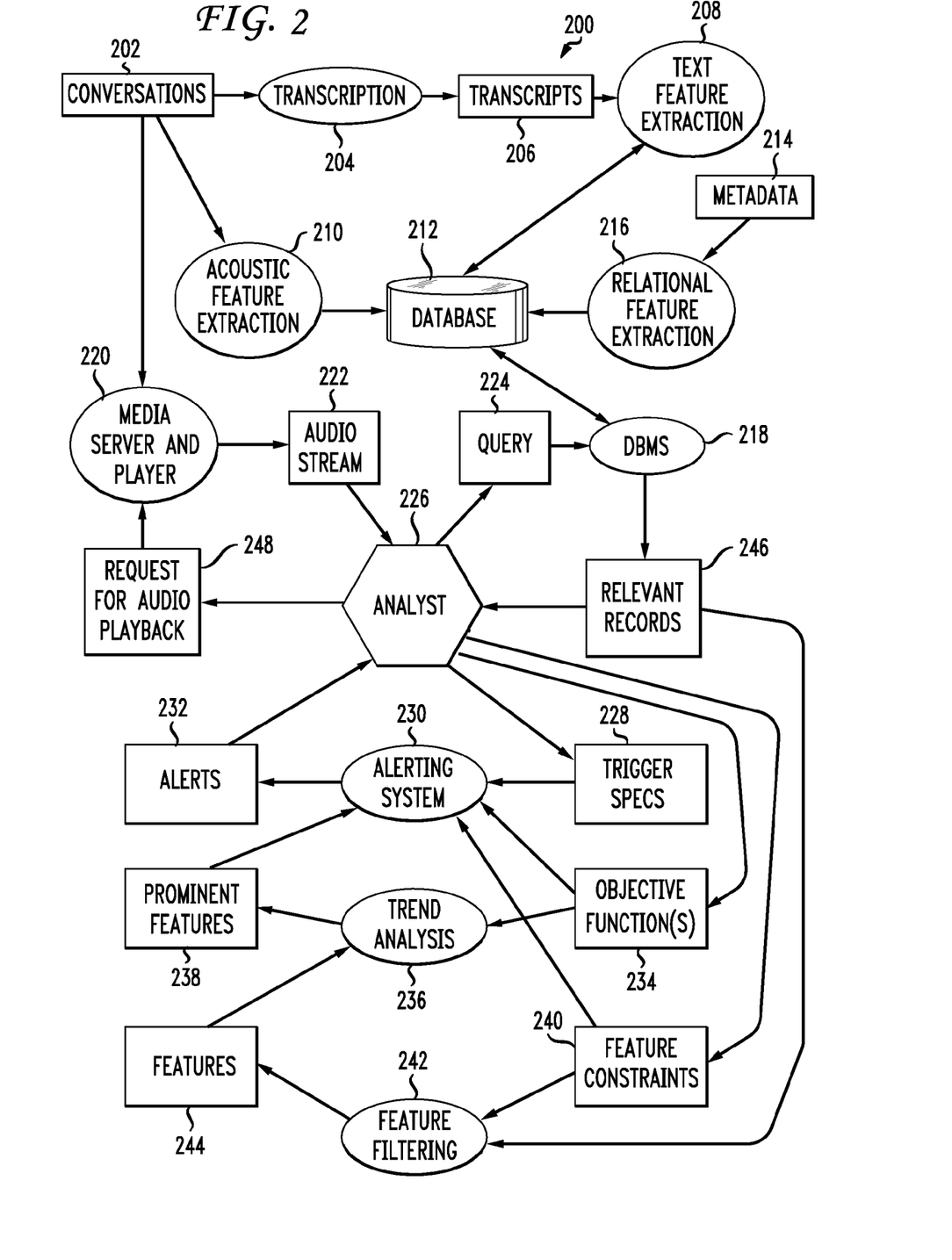
FIG. 2 illustrates a flow diagram of an exemplary speech analytics system.

With this in mind, the discussion now turns to the exemplary speech analytics system architecture 200 as shown in FIG. 2. Speech analytics systems vary widely in their level of sophistication. Some offer little more than speech browsing and retrieval. Others present additional layers of functionality, which build one on top of another. One example foundational analytics layer is feature extraction. Before a speech analytics system can do anything with its collection of conversations, it must extract various pieces of information ("features") from each conversation. Speech analytics systems use a variety of features to inform their most basic function—retrieving conversations that match certain criteria. Thus, a retrieval layer can be built upon the feature extraction layer.

A browsing layer can be built on the retrieval layer. The browsing layer offers analysts a way to see and/or listen to examples of the kinds of data, such as retrieved conversations, that contributed to salient aspects of its analyses. The actual analytics functionality of a speech analytics system begins with the next layer, trend analysis, which is also built on the retrieval layer. Finally, a subsystem performing the work of an alerting layer can be built on top of the trend analysis layer and/or the retrieval layer.

The top half of FIG. 2, above the hexagon representing the analyst 226, illustrates the browsing and retrieval functionality layers of a speech analytics system. In FIG. 2, the rectangles represent data and ovals represent process modules. In one aspect, the transcription 204, text feature extraction 208, acoustic feature extraction 210, and relational feature extraction 216 process modules run regardless of whether an analyst 226 is using the system 200 at the time. The system 200 converts the original conversation data 202 to a format suitable for audio streaming 222 through a media player and stored on a media server 220 for subsequent retrieval and playback upon request 248 from the analyst 226. The transcription module 204 transcribes the conversations 202 to produce a set of transcripts 206. The text feature extraction module 208 extracts words and a variety of other information from the transcripts 206 and adds the extracted information to a database 212. The text feature extraction module 208 can also extract non-verbal information from the conversations which can be used to inform the text feature extraction module 208. The relational feature extraction module 216 can extract metadata 214 pertaining to each conversation and add it to the database 212 as well. Metadata, or information about the conversations other than their actual contents, can play an important role in speech analytics systems.

The analyst 226 typically initiates operation of the media server and player 220 and the database management system (DBMS) 218. The analyst 226 can initiate a speech retrieval session by issuing a query 224 to the DBMS 218. The DBMS 218 returns the relevant records 246 that satisfy the query 224. The system 200 presents the records 246 in a user interface that allows the analyst 226 to "drill down" through the list of records returned to examine individual records and listen to individual conversations. The media server and player 220 support this browsing and playback functionality.

The first layer of analytics functionality can be implemented on top of a speech browsing and retrieval system, merely by exploiting the usual capabilities of the DBMS 218. Most DBMSs support some variation of the ubiquitous SQL relational query language, such as commercial databases available from Oracle, Microsoft, and IBM, as well as open source databases such as MySQL, PostgreSQL, and SQLite. Most flavors of SQL include primitives for sorting, grouping, counting, and averaging of database records. The rudimentary analyses supported by SQL enable analysts to ask "what/which" questions about speech data, such as "Which conversations involving customer service agent Jane talked about product XYZ?" and "What was the average length of conversations that discussed issue ABC?" Such questions are typically motivated by a specific business problem that the analyst 226 is trying to solve, such as agent Jane's understanding of product XYZ or the labor costs of resolving issue ABC. However, in order to ask the right kinds of questions in a traditional implementation, the analyst 226 must already know what the problem is.

In many situations, the analyst 226 is aware that a problem exists but does not know exactly what the problem is or how to look for it. In such situations, the analyst 226 can ask the system the more difficult "why" questions, such as "Why were our customers' assessments of our service agents so low last week?" or "Why is the average call duration so high in our Texas call centers?" The system 200 can answer such questions using the next layer of speech analytics functionality, represented by the feature filtering module 242 and the trend analysis module 236. The system 200 can mathematically formulate such questions as problems of statistical feature selection. In other words, the analyst 226 wants to know which "features" of the data best explain one particular statistic of the data, such as call duration. This statistic is called the objective function 234, which is provided as input to the trend analysis module 236. A feature can be any piece of information that the system's database contains about each conversation 202. The number of potential features can be very large, so an analyst 226 can provide the system 200 with additional guidance about the kinds of features that the analyst 226 thinks might be relevant. Such guidance can be formulated as a set of "feature constraints" 240, which are fed to the feature filtering module 242.

The trend analysis module 236 then induces a model of how the selected features 244 correlate with the objective function 234, and the system 200 reports the most highly correlated, or prominent, features 238 to the analyst 226. These highly correlated features 238 are often called "drivers" in business contexts. Unfortunately, "drivers" is a misleading misnomer, because correlation is not the same as causation. Trend analysis can be generalized from explaining one statistic to explaining how one statistic varies with respect to another, such as time. For example, the analyst 226 can ask which features contribute to the fluctuation of call duration over time, or which features best explain a spike in call volume. In terms of data flow, the only additional information necessary for this generalization is an additional objective function 234. Thus, the analyst 226 can specify multiple objective functions 234 for the trend analysis module 236.

All the modules and their functionality described so far either run independently of the analyst 226 or are initiated by the analyst 226. The next layer of functionality, represented by the alerting system module 230, lets the speech analytics system 200 take the initiative. The alerting system module 230 sends alerts 232 to the analyst 226 when the DBMS 218 meets certain conditions about which the analyst 226 is interested. For example, the analyst 226 wants to be alerted whenever the mean call duration increases by 10% from one week to the next. If suitably configured, the speech analytics system 200 can automatically perform the relevant trend analysis every week, and notify the analyst 226 whenever the condition of interest is satisfied. Alternately, the speech analytics system 200 can provide a report to the analyst 226 summarizing the status and/or trend of the mean call duration even if the condition is not satisfied. The disclosure now turns to a more in-depth discussion of some of the modules in FIG. 2.

First, the disclosure addresses the transcription module 204. In some situations, manual transcriptions are feasible, preferable, or even mandated by law. For example, the proceedings of many courts and parliaments are manually transcribed, and others are recorded. In many speech analytics systems, an automatic speech recognition (ASR) transcription system performs transcription. In this case, the quality of analyses done by the speech analytics system 200 greatly depends on the accuracy of the transcriptions.

Building accurate ASR systems for call center recordings is often particularly challenging because the vendors of call center recording and archiving equipment aim to minimize storage requirements. Vendors tend to compress the audio to 6000 samples per second or less, which might still be enough for people to understand it. ASR systems are not nearly as good as people at understanding poor quality recordings, but call center recording equipment is typically not designed for ASR.

Another challenge for any large-vocabulary ASR system used in production is that language tends to evolve. For example, a company can introduce new products and services, whose names subsequently come up in call center recordings. Accordingly, the accuracy of an ASR system used by a speech analytics system 200 will degrade over time, unless a user updates the vocabulary. Even if an ASR system is updated regularly, delays between the introduction of an important new term, such as a new product name, and the ASR system's ability to recognize that term will still occur.

One consideration when building ASR systems is what counts as good ASR. Most ASR systems are built and configured to optimize well-known evaluation measures such as word error rate, but such evaluation measures are not the most relevant for many analytics purposes. In particular, for accurate speech retrieval, words that are likely to be used as search terms are more important than other words. Function words are unlikely to be search terms. When tuning the various parameters of an ASR system for use in speech analytics, the ASR system builder can remove function words from consideration by the evaluation measure. For example, the system builder can delete function words from the system's hypotheses and from the reference transcriptions. The system 200 and/or the analyst 226 can grade the remaining content words by their likelihood of being search terms, and their evaluation can be weighted accordingly.

Another important trade-off in ASR systems is errors of omission versus errors of commission, also known as deletion and insertion errors, respectively. The standard error measures treat the two types of error equally, but insertion errors are much more damaging to most speech retrieval systems than deletion errors because listening to conversations is time-consuming. Analysts usually try to minimize the number of conversations that they listen to for the purpose of any particular analysis. Thus, on the one hand, retrieving irrelevant conversations wastes the analyst's time. On the other hand, if search terms are obtained from the output of trend analysis as described below, then those terms are likely to appear in many conversations. Therefore, finding a few relevant conversations is typically not difficult, and so deletion errors can be tolerated more easily. This trade-off between insertion and deletion errors can be controlled by the word insertion penalty parameter in most modern speech decoders. This trade-off can be optimized given an objective evaluation measure, such as word error rate.

The disclosure now turns to a more in-depth discussion of the text feature extraction module 208. At a minimum, the text feature extraction module 208 records which words occur in which transcripts. To enable efficient searches for multi-word phrases, the database can use data structures such as suffix trees. The text feature extraction module 208 can then implement the algorithms necessary to populate these data structures. Many other kinds of features can be inferred from the words and phrases in transcripts.

One way to infer features in the context of speech analytics is to classify each conversation into one or more of a set of predefined classes. For example, the system 200 can tag each call to a call center with one or more reasons for the call, or tag each lecture in a series with cross-references to related topics. A system designer or the analyst 226 can design the classes to be used. Automatic classifiers built using machine learning techniques, such as boosting, can then perform the classification.

Like other texts, conversation transcripts exhibit syntactic structure, dialogue structure, and discourse structure. Information about these structures can be very useful for speech retrieval and higher analytics functionality. For example, if syntactic dependencies are recorded in the database 218, the analyst 226 can search for all records where "widgets" depended on "purchase", even if "widgets" was preceded by a quantifier like "two boxes of". If dialogue structure is recorded in the database, the analyst 226 can search for all records where the service agent (rather than the customer) used profanity. If discourse structure is recorded in the database, the analyst can search for all records where the words "wrong number" occurred in the "Reason for Call" section of the conversation, as opposed to other sections. This task can be more difficult for speech transcripts than other bodies of text because transcripts usually contain ASR errors, and because transcriptions lack orthographic clues such as case and punctuation. The impoverished orthographic representation can necessitate customization of basic natural language processing tools, such as part-of-speech taggers, named-entity taggers, co-reference resolvers, and syntactic parsers. On the other hand, speech contains acoustic information that can often be exploited to compensate for the shortcomings of transcripts. Approaches to exploit acoustic information are discussed below with regard to the acoustic feature extraction module 210.

Another type of language analysis is opinion extraction. This type of analysis can be particularly relevant for customer service call centers, where tracking and/or improving customers' opinions about a product or its producer is often a large part of a call center's entire purpose. However, some commonly employed opinion extraction techniques are much less reliable when applied to noisy ASR output. One approach to avoid compounding errors from ASR and opinion extraction is to transcribe speech directly into opinions without first transcribing into words. In addition to serving as search constraints, classification, structural, and opinion features can play an important role in trend analyses. Trend analysis is discussed in more detail below.

The disclosure now turns to a more in-depth discussion of the acoustic feature extraction module 210. Acoustic information is what distinguishes speech analytics from text analytics. Some acoustic features can be used by a speech analytics system by themselves. For example, the acoustic feature extraction module 210 can classify speakers into different emotional states. Reliable information about customers' emotional states can greatly help an analyst to focus on problematic calls in a call center or other environment. Similarly, reasons for customer dissatisfaction often correlate to the emotional intensity of a call, as represented by pitch variance and loudness.

The system 200 can store acoustic features in the database. Speaker segmentation and classification is one example of where acoustic information is used together with the transcript to infer additional useful features. If the system 200 knows which words were spoken by agents and which words by customers, then the system 200 can index the two sources of speech separately. Then, the analyst 226 can search for calls where certain words were spoken specifically by one source and not the other.

Speaker segmentation and classification is relatively straightforward when customers and agents are recorded on separate channels, but unfortunately most call center equipment records both agents and customers on a single channel. In these cases, the speech analytics system 200 is forced to rely on automatic segmentation and classification methods. In one implementation, these methods use information both from the acoustics and from the transcript. The transcript provides clues about where speaker turns start and end, such as words that are often seen around these transition points. A language model can also help to distinguish word sequences that a customer is more likely to say from word sequences that a service agent is more likely to say. Clues about speaker changes provided by acoustics include sharp changes in mean pitch over adjacent time windows (such as in a typical conversation between a male and a female), changes in formant distributions, rising pitch contours which often indicate a question, falling pitch and energy near the end of declarative utterances, and longer than average silences. All of these clues indicate a higher likelihood of a speaker transition. The system 200 can take both acoustic and text features into account for speaker segmentation and classification.

Beyond speaker segmentation, the system 200 can apply acoustic and text features in conversation segmentation. For example, in many call centers, when an agent puts a customer on hold, the customer hears pre-recorded advertisements for one or more of the company's products until the agent comes back on the line. These advertisements are not really part of the conversation between the customer and the agent, but they are nevertheless included in the recording of that conversation. The transcripts of these advertisements can be a problem if the analyst 226 attempts to retrieve calls that mention one of the advertised products. The analyst 226 is typically interested in calls where a product is mentioned by the customer or the agent, not in an ad. Since any given ad usually appears in many calls, the analyst 226 can be swamped with retrieved records where the product was mentioned only in an ad, making it difficult to find what the analyst 226 is really looking for. The speech analytics system 200 can segment the recording into ad and non-ad segments, and then filter out the ads.

In one implementation, conversation recordings include information about where ads begin and end. However in other implementations, this information is unavailable due to cost, equipment, or other limitations. So, the speech analytics system 200 can find the ads automatically. One way to find these ads automatically is based on both acoustic and transcript information. In one example of the acoustic side, voices in ads may vary their pitch much more than the voices of agents or customers. In an example of the transcript side, because any given ad appears in many calls, the n-grams that constitute an ad will have much higher frequency, on average, than the n-grams surrounding the ad.

The disclosure now turns to a more in-depth discussion of the relational feature extraction module 216. The job of the relational feature extraction module 216 is to convert metadata 214 into a form suitable for storing in a relational DBMS 212, 218. Most of the metadata 214 associated with conversations in the speech analytics system 200 is atomic, in the sense that it does not represent anything beyond itself. For example, calls to a call center come with information about who called, who answered, and when the conversation started and ended. Thus, most of the work of the relational feature extraction module 216 includes adding these unstructured pieces of data to separate fields in the relevant database records.

Some metadata is not atomic, however. For example, a customer ID attached to a call might be the key to a great deal of information that a company has about that customer. An agent or an analyst 226 might well have reason to search for calls from customers of a certain type. For efficiency, the system 200 can add the customer information to the call record in advance. The relational feature extraction module 216 can perform a join operation between the call records and the customer records.

Further, the metadata 214 can hierarchically structured. One example is information about a company's employees, who are usually organized in a hierarchical reporting structure. A customer service agent reports to a supervisor, who reports to a floor manager, who reports to a call center manager, who reports to a VP, who reports to the CEO. An analyst 226 interested in the effectiveness of managers at different levels of the hierarchy can analyze calls taken by all the agents that report to a certain supervisor, or calls taken by all the agents whose supervisors report to a certain manager, and so forth. In one aspect, the analyst 226 can compare two sets of calls by agents reporting to different supervisors, some of which may be overlapping if certain employees report to multiple supervisors. To support such queries, the relational feature extraction module 216 can flatten the hierarchy by means of transitive closure. In other words, the relational feature extraction module 216 can create a separate database table that records every pair of employees that occur on some shortest path from the root to a leaf in the company hierarchy.

The disclosure now turns to a more in-depth discussion of the database management system (DBMS) 218. The DBMS 218 performs two tasks. On the server side, the DBMS 218 searches the database to find records that satisfy the analyst's 226 query 224. On the client side, the DBMS 218 enables the analyst 226 to easily formulate the query 224, to understand the results 246, and to iteratively refine the query based on the results.

The database 212 can be relational, except for the text index, or any other type of database. However, relational databases are commonly used because they are mature and efficient enough for the kind of data in most speech analytics systems. The database can be searched via standard or other query languages such as SQL, which include text search primitives and text indexing facilities. Queries about text fields can be combined with queries about other fields in relational DBMSs. The real challenge is to design an intuitive user interface for the analyst 226, which hides the complexities of the database from the analyst 226 without limiting the power and flexibility of the database. Relational query languages can include syntax for specifying a set of constraints on the values of fields in the database's records, a set of fields to display from the records that satisfy the constraints, and a method for ordering those records, as well as other commands.

As mentioned above, some query languages provide part or all of the first layer of analytics functionality. For example, using nothing but SQL on the command line, a skilled analyst 226 can group the records returned by the DBMS 218 on the values of certain fields, count the number of records in each group, sum or average the numeric fields within each group, and then sort on one of those sums or averages, to find the groups with the smallest or largest values in those fields. The basic operations involved in this analysis are grouping, counting, summing, averaging, and sorting. These operations fall under the definition of analytics, because they aggregate information from multiple conversations. Some speech analytics systems do not allow analysts 226 to formulate queries 224. Instead, queries 224 are formulated in advance by the designers of the system 200, based on their understanding of what analysts 226 might need. The system 200 can then proactively issue the queries to the DBMS 218 on a recurring basis for trend analysis and alerting.

The disclosure now turns to a more in-depth discussion of the media server and player 220. Once the analyst 226 finds a set of conversations 202 that match the search criteria in the query 224, the analyst 226 may want to listen to some of them. To support such audio browsing, the detail report can include hyperlinks to the relevant audio files. If an analyst clicks one of these hyperlinks, an audio player 220 is launched to play back the corresponding conversation.

The difficulty with audio browsing is that an analyst 226 cannot skim audio files the way that he or she can skim text or hypertext files. Without special tools, the analyst 226 has no way to skip to the parts of an audio file that pertain to a certain topic. When dealing with long conversations, the analyst 226 can waste a significant quantity of time listening to speech in which he or she is not interested.

When speech browsing follows speech retrieval, the system 200 can use the query 224 used for retrieval, together with the transcripts 206, to ameliorate this problem. Specifically, if the query 224 includes one or more search terms, then the analyst 226 can skip directly to the part(s) of a conversation where those terms were spoken. Several techniques can make this possible. First, the transcripts 204 can include information about the time offset of each word that they contain. Second, the media player 220 can start playing an audio source from a specific time offset. Third, since the audio files that contain long conversations can be very large, the media server can take a long time to stream to the media player. So, for optimum effectiveness, the media server should be able to start streaming audio from a specified time offset.

An exemplary audio player can make it easy for an analyst 226 to skip to instances of search terms in a recording. The audio player can include some components that exist in many other software audio players, such as a progress bar, a Play/Pause button, and playback speed control. However, the audio player can include additional features specifically designed for audio browsing. For example, the analyst 226 can click anywhere in the progress bar to play the recording from that point. This feature is particularly useful when the progress bar indicates the locations of the search terms in the transcript, such as with vertical tic marks. The audio player can display a list of word contexts where the search terms are found in the transcript. The analyst 226 can click on any of these contexts to listen to the corresponding audio segment. A CC button can turn on closed-captioning, which displays a moving window of words in the transcript synchronized with the audio playback. Closed captioning can be helpful for following the recording, especially when fast-forwarding.

The disclosure now turns to a more in-depth discussion of the features and abilities of the trend analysis module 236.

The ability to perform trend analysis is one distinction between sophisticated speech analytics systems and simple ones. Existing approaches are designed to analyze only one particular trend. However, different analysts 226 might want to track different trends in the same database. For example, a sales analyst might want to track the number of conversations that mention the name of a particular product, whereas a call center manager might want to track the customer service ratings of different agents. The trend analysis module 236 disclosed herein is more useful and can be configured to analyze a large variety of different trends. This kind of configurable module requires a set of constraints on the records to be used in the analysis, a set of constraints on the candidate features 240, and an objective function 234 with respect to which trends will be analyzed. These three items are discussed below, in turn.

The trend analysis module 236 compiles a query out of the record constraints. The trend analysis module 236 sends this query to the DBMS to obtain a subset of records from the database, just as if the analyst were doing retrieval. However, the system 200 sends the set of records 246 returned by the DBMS 218 to the feature filtering module 242, instead of being displayed to the analyst.

Almost any aspect of a conversation 202 or its metadata 214 can be a feature, such as the frequency of certain words in the conversation, or whether any part of the conversation was through a cell phone. In the simplest scenario, the set of feature constraints 240 is empty, and all available features of each record in the set are used, including transcript features, acoustic features, metadata features, and higher-order features inferred from them. In this scenario, the feature filtering module 242 filters out nothing. More typically, however, the analyst 226 knows in advance that some features or types of features either are not relevant or are not likely to be relevant to the analysis, because common sense tells them that those features are not causally related to the objective function 234. In this case, the analyst 226 can remove some features or feature types from consideration.

The objective function 234 can be one of the features, or a mathematical function of one or more features. For example, customer satisfaction is an important objective function for most businesses, and consequently also for their speech analytics systems. In order to track caller satisfaction with a particular agent, product, or other aspect of their relationship with the company, call centers often give callers the option to take a survey at the end of the call. Such surveys typically elicit scalar responses, using questions such as "How would you rate the agent's courtesy, on a scale from 1 to 5?" The answers to the survey questions then become part of the call's metadata, and are available for statistical modeling. More generally, an objective function 234 can combine two or more features. For example, a call center analyst 226 can analyze the summed frequency of all swear words over some time period.

Given these three kinds of information, the trend analysis module 236 induces a model of how the objective function 234 can be explained by the selected features 244. The model assigns a weight to each input feature 244, which represents that feature's correlation with the objective function 234. The trend analysis module 236 ranks the features on the magnitude of their weights, and presents one or more of the highest-ranked features, or prominent features 238, to the analyst 226. Statistical regression is one possible way to assign weights to features. For a regression problem that includes a large number of features, such as the vocabulary of speech transcripts, it is important to choose a method with built-in regularization. The purpose of regression in this application is not the usual purpose. Usually, users induce regression models for the purpose of predicting the values of the objective function on future examples. In contrast, this application induces the regression model to determine the weights of the features, rather than in what the features say about any particular examples.

Regardless of how the feature weights are induced, speech analytics system designers should be aware that correlation is not the same as causation. High customer satisfaction ratings might correlate highly with the phrase "thank you" in conversation transcripts, but that phrase is probably not the cause of customer satisfaction. In fact it is more likely to be the other way around. The approaches disclosed herein provide a reliable and efficient tool for an analyst to determine correlation and causation among a large number of variables.

Figure 3:
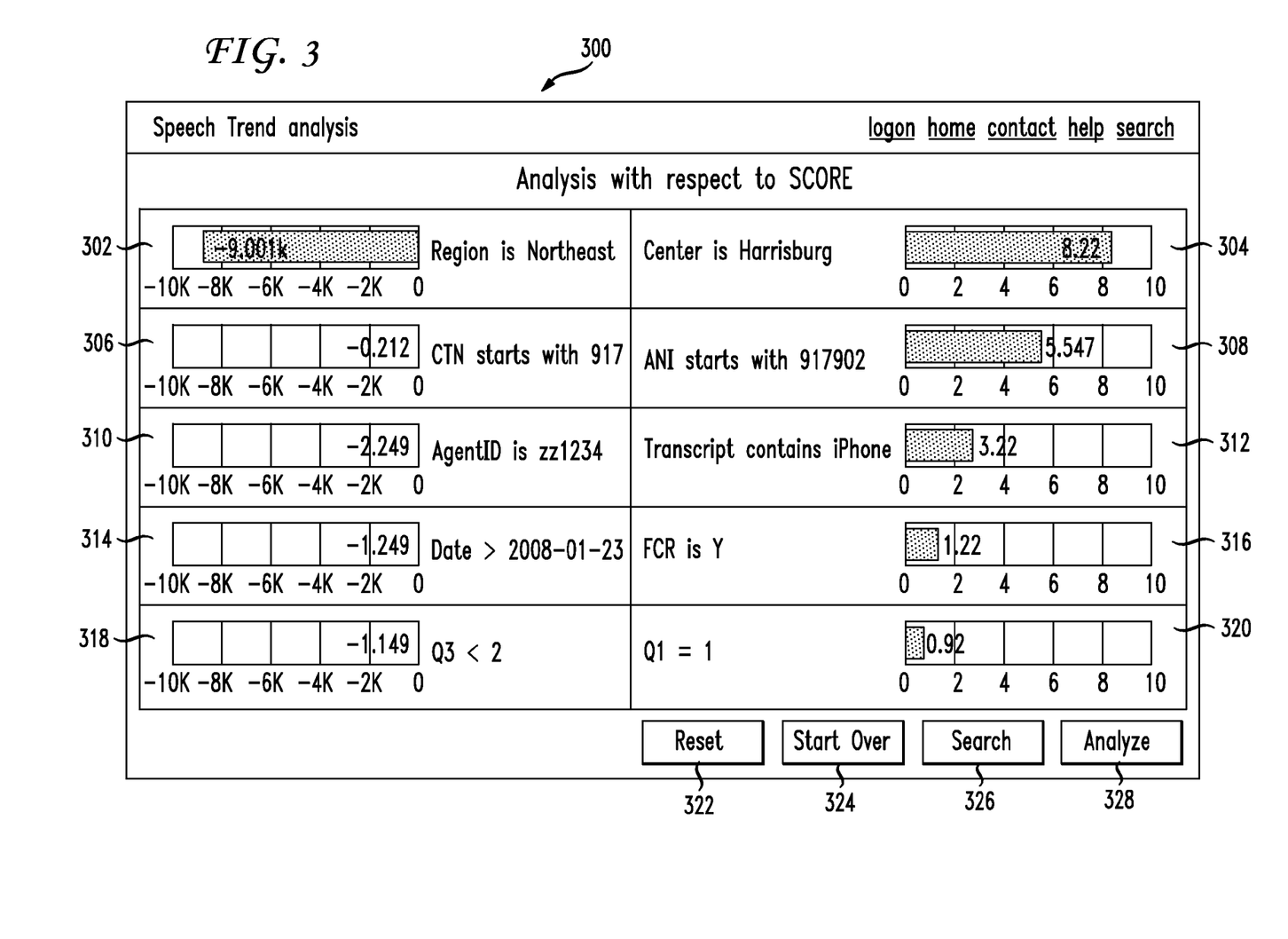
FIG. 3 illustrates an exemplary trend analysis graphical user interface.

As with the other speech analytics functionalities that involve an analyst 226, trend analysis 236 is only as effective as the user interface. A well-designed user interface offers the analyst 226 an easy way to focus on records with certain highly predictive features. The interface can also offer an easy way to filter out features 244 and/or feature types in an iterative manner, in order to remove those that the analyst 226 decides are unlikely to be the cause of variance in the objective function 234. FIG. 3 illustrates an exemplary trend analysis graphical user interface 300. To get to this part of the system, the analyst 226 specifies a set of search constraints. Then, the analyst 226 can select an objective function 234 from a drop-down menu (not shown), and click a separate analyze button. In this example, the objective functions 234 are limited to individual numeric fields, but can be expanded to include other options. FIG. 3 illustrates the result of a trend analysis with respect to the Score field, which in this context represents a measure of customer satisfaction. The display is divided in two columns. The left column shows the five features 302, 306, 310, 314, 318 that are the most negatively correlated with the objective function, and the right column shows the five features 304, 308, 312, 316, 320 that are the most positively correlated. Both columns are sorted by magnitude from the top down, but can be presented in other arrangements as well. In this example, CTN in feature 306 stands for calling telephone number, Q1 and Q3 in features 318, 320 refer to customer responses to survey questions, ANI in feature 308 stands for automatic number identification, and FCR in feature 316 stands for first call resolution. These features are clues of where to look for a particular problem or for the source of a particular good trend. For example, a bad or incorrect training session in one region's call center can lead to bad customer survey results or poor sales in that region. These features can reveal evidence pointing to the bad or incorrect training as the source of the problem.

For each feature, the interface 300 gives a human-readable description, the correlation value, a bar graph to help the analyst 226 visually compare correlation magnitudes, and check boxes, not shown. The analyst 226 can use check boxes, along with the buttons 322, 324, 326, 328 at the bottom of the interface 300, for iterative refinement of the analysis. One example check box for each feature is an Ignore check box. If the analyst 226 checks this box for one or more of the displayed features and clicks the Analyze button 328 again, then the system repeats the analysis without those features. Thus, other features will make it into the list of top five most highly correlated features, and will be displayed instead of the featured that were ignored. Another example check box is a Focus check box. If the analyst 226 checks this box for one or more of the displayed features and clicks the Analyze button 328, the system repeats the analysis just for the subset of records whose values on those features contributed to the magnitude of the correlation. For scalar features and positive correlations this can mean having a value above the mean, and for negative correlations a value below the mean. For Boolean features, this can mean having a value of True for positive correlations and False for negative correlations. Of course, users can also check a combination of Focus and Ignore check boxes, in which case the reanalysis focuses on a subset of the records while ignoring certain features.

After checking some check boxes, the analyst 226 can click the Search button 326 instead of the Analyze button 328. The system 200 returns the interface to a search and retrieval interface, and immediately executes a search for the records that satisfy the conjunction of the Focus constraints and the originally specified search constraints. In this manner, the analyst can seamlessly switch between the retrieval and trend analysis functionality layers of the system.

In one approach to trend analysis, time is the objective function 234. When the analyst 226 chooses time as the objective function 234, the analyst 226 is effectively asking "What features change the most over time?" Examples of possible answers to this question that might interest the analyst 226 include the average customer satisfaction rating, the volume of calls from Kansas, and the frequency of the phrase "cancel my service". When such answers come up, they often reveal problems that were previously unknown, giving analysts or their organization an early opportunity to address them.

The time objective function 234 is sometimes misused when the objective function 234 of interest is actually something else. If the analyst 226 wants to determine why customer satisfaction ratings fluctuate over time, and they suspect that the answer lies in conversation transcripts, the analyst 226 can run trend analysis with time being the objective function and the features taken from the transcripts, to see what comes out on top. Such an analysis can sometimes reveal valuable clues, but there is a more direct and more reliable way to do it. What the analyst 226 really wants to do is feature selection with respect to two objective functions: the ratings and time. Existing speech analytics systems do not offer this functionality, which is a major reason why the time objective function is often misused.

Another example of two objectives that can be usefully analyzed together is customer satisfaction ratings and call durations. Most call centers strive to maximize the former while minimizing the latter. These goals are difficult to achieve simultaneously, because the values of these two statistics tend to rise and fall together. However, the correlation is far from perfect, and there are typically many ways to influence the two statistics disproportionally. The analyst 226 can run trend analysis with these two objective functions to discover features that affect one statistic more than the other does.

From a mathematical point of view, feature selection with two objective functions is a generalization of feature selection with one objective function 234. Instead of asking which features best explain the variance of one objective, the approach disclosed herein asks which features best explain the covariance of two objectives. Multivariate regression is one type of statistical regression for answering such questions. Naturally, these algorithms can be further generalized to three or more objective functions, but it is more difficult to imagine useful cases for such generalizations in a speech analytics system. The trend analysis GUI can be generalized to accommodate two or more objective functions. For example, the GUI can substitute the pull down menu of objective functions with a set of check boxes so that the analyst 226 can select any number of functions.

The disclosure now turns to a more in-depth discussion of the features and abilities of the alerting system module 230. Effective alerting is a long-sought-after goal of analytics systems, especially an analytics system that automatically generates an alert whenever an important change occurs in the data. Alerting systems necessarily deal with time series, since their output would always be the same if time is not considered. For the purposes of speech analytics, the system is concerned with discrete time series, since records in the database are discrete. One of the inputs to the alerting system is a time interval size. Each element of a time series represents records having timestamps that fall into the same interval of the given size. Independent of the interval size is the interval offset, which can greater than, equal to, or less than the interval size. If the interval offset is equal to the interval size, then the intervals are disjoint and if the interval offset is less than the interval size, they overlap. The alerting system can analyze many time series.

The process of analyzing a large number of events for anomalies is susceptible to false alarms. False alarms reduce the effectiveness of alerting systems, because they dilute the attention of the analyst 226. Even when sophisticated statistical methods are employed to reduce the false alarm rate, the analyst 226 can still restrict the records that participate in the alerting module using a query, the same way as they would for retrieval or trend analysis. The analyst 226 can also configure the alerting system module 230 to analyze time series for a hand-picked set of features, or for all the features of a given type, such as all the customer service agents, or the 1,000 most frequent words in the vocabulary.

The system 200 can derive the numeric value corresponding to each element in a time series by summing and/or averaging the value of one particular feature of the relevant records, such as the frequency of a particular word or call duration. However, the system 200 can also derive the numeric values from arbitrary mathematical transformations or aggregations of the chosen features. One possibility is to construct a time series of the weights that the trend analysis module 236 assigns to one or more features 238 with respect to an objective function 234 of interest. Such a time series would enable alerts such as "agent ID abc123 has become highly correlated with increased customer service ratings." To check for such an alert condition, the alerting system module 230 can call the trend analysis module 236 to get feature weights. Having defined some time series, the analyst 226 can choose between alerts about the values of time tics, and alerts about changes in those values over time. In the case of changes over time, the analyst 226 can specify a length of time against which to compare. For example, one analyst wants to be notified whenever the mean call duration exceeds 10 minutes, another analyst wants to be notified whenever the mean call duration significantly increases from one day to the next, and a third analyst wants to be notified whenever the mean call duration for a given day is significantly higher than the mean for the preceding hundred days. What counts as a significant increase or decrease can be expressed in absolute terms, such as 2 minutes, or in relative terms, such as 20% less or more than an average value. After deciding between individual values and changes of values, and, if applicable, between absolute and relative changes, the analyst 226 can also supply the threshold value, such as 10 minutes or 20%.

The analyst 226 can also specify how often and under what conditions the alerting system module 230 is to notify the analyst 226 that an alert was triggered. In the simplest scenario, the alerting system module 230 sends alerts 232 to the analyst via an email or SMS message whenever one of the alerts is triggered. To prevent a flood of alerts, the analyst can instead request that the alerting system module 230 send alerts 232 no more than once per hour, per day, or per week, for example. Alternatively, the alerting system module 230 can publish the alerts 232 on an alert page or dashboard whenever the analyst 226 logs into the system 200. In yet another variation, the alerting system module 230 can compile a report of alerts 232 over a given interval and send the report to the analyst. In some cases, the report can include a status report of non-alert events, such as "call duration—normal", to reassure the analyst 226 that those non-alert events are within normal tolerances. The analyst 226 can set certain exceptions to these general guidelines for the alerting system module 230 to handle critical or highly important alerts appropriately. For example, the analyst 226 can set an exception that if customer satisfaction drops below a certain threshold, then the alerting system module 230 is to send an alert 232 immediately. In some cases, the alerting system module 230 sends multiple alerts 232 to multiple individuals and/or over multiple media for a single trigger. Another possible degree of flexibility is to notify the analyst 226 only when some conjunction of alert conditions is triggered.

The specification of a trigger in a fully flexible alerting system can include a time interval size, a time interval offset, a set of record constraints, a set of feature constraints, an objective function (sum, average, weight, etc.), choice between analyzing individual values or changes over time, if analyzing changes then a choice between absolute or relative changes, if analyzing relative changes then a length of time to compare against, a threshold of significance, which alerts or conjunctions of alerts should generate a notification to the analyst, and/or the minimum delay between consecutive notifications.

Figure 4:
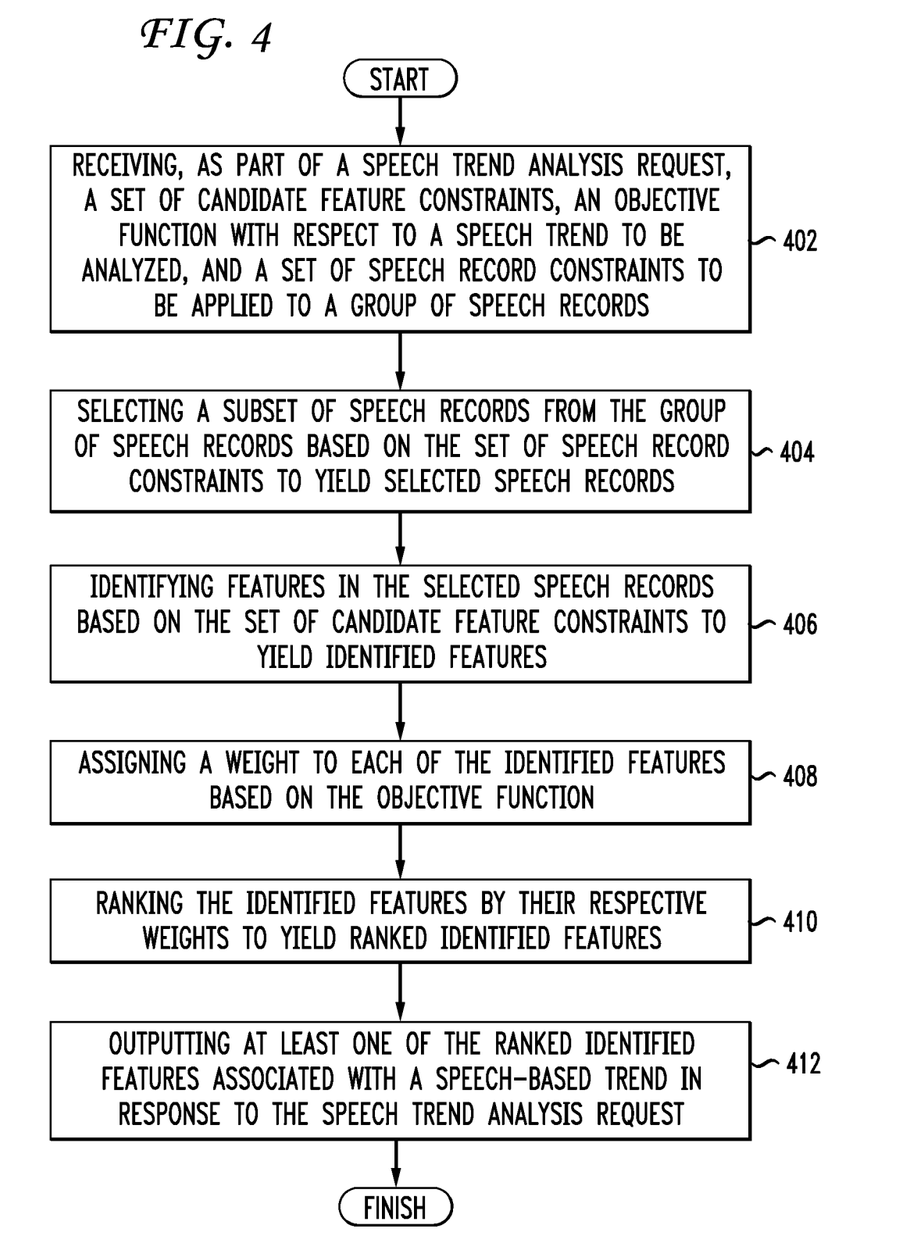
FIG. 4 illustrates an example method embodiment for performing trend analysis of speech.

Having disclosed some basic system components, the disclosure now turns to the exemplary method embodiment for performing trend analysis as shown in FIG. 4. For the sake of clarity, the method is discussed in terms of an exemplary system 100 such as is shown in FIG. 1 configured to practice the method. First, the system 100 receives, as part of a speech trend analysis request, a set of candidate feature constraints, an objective function with respect to a speech trend to be analyzed, and a set of speech record constraints to be applied to a group of speech records (402). The group of speech records can include recorded speech, transcriptions, and/or metadata. The system 100 can use the set of candidate feature constraints to constrain transcript features, metadata features, and/or higher order features inferred from the transcript features and metadata features. In one aspect, the set of candidate feature constraints is an empty set, meaning that all features are allowed. The objective function can be a mathematical function, a single feature, a combination of features, and/or time.

The system 100 selects a subset of speech records from the group of speech records based on the set of speech record constraints to yield selected speech records (404). The system 100 can select the subset of speech records by generating a database query command corresponding to the speech record constraints, and executing the database query command. The system 100 can then pass the results of executing the database query command to a feature filtering module which identifies the features in the selected speech records. In one aspect, the system 100 does not display these results to a user.

The system 100 identifies features in the selected speech records based on the set of candidate feature constraints to yield identified features (406), assigns a weight to each of the identified features based on the objective function (408), and ranks the identified features by their respective weights to yield ranked identified features (410). In one aspect, the system outputs the ranked identified features via a user interface in which a user can focus on records with highly predictive features. In other aspects, these ranked identified features are fed to another module or system without output to a user. For example, the system 100 can feed these ranked identified features to an alerting subsystem or a report generator that generates a feature summary for display to the user without displaying the actual features summarized.

The system 100 outputs at least one of the ranked identified features associated with a speech-based trend in response to the speech trend analysis request (412). After outputting at least one of the ranked identified features, a user can revise the speech trend analysis request by filtering out one or more feature constraint from the set of candidate feature constraints. This approach allows the user to refine and drill down to a particular set of features related to the speech-based trend. Examples of this are discussed above with respect to FIG. 3.

Figure 5:
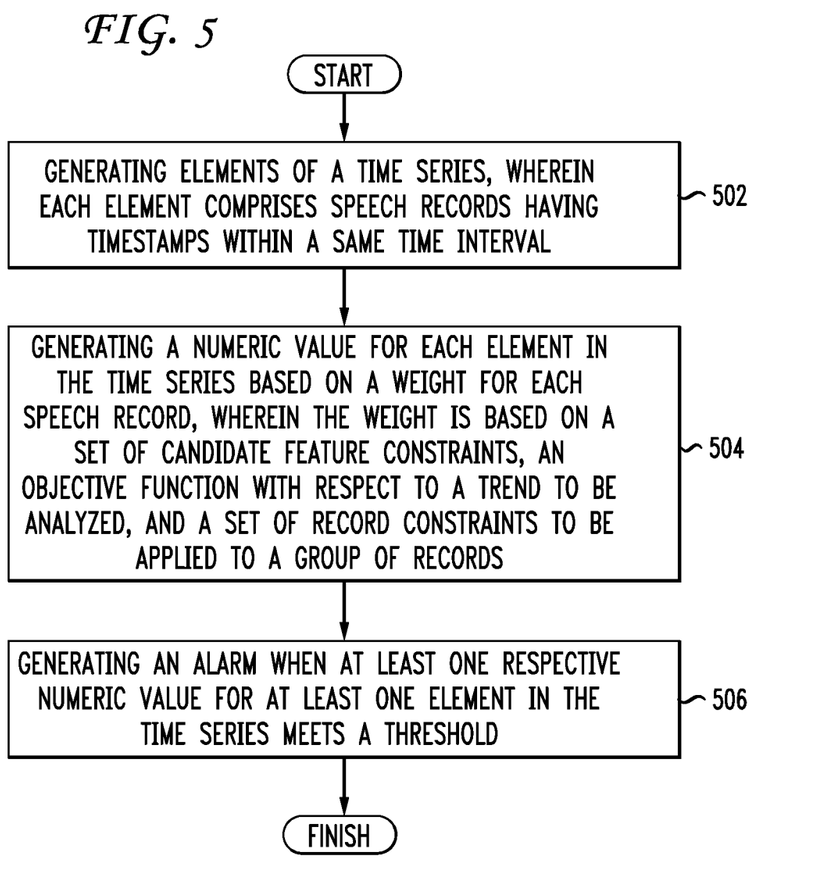
FIG. 5 illustrates an example method embodiment for generating an alert based on speech analytics data.

The disclosure now turns to the exemplary method embodiment for generating an alert based on speech analytics data as shown in FIG. 5. This method is also discussed in terms of the exemplary system 100 shown in FIG. 1. The system 100 generates elements of a time series, wherein each element comprises speech records having timestamps within a same time interval (502). The user can specify the size of the time interval. Further, the elements of the discrete time series can be separated by an interval offset which can be user specified or predefined.

The system 100 generates a numeric value for each element in the time series based on a weight for each speech record, wherein the weight is based on a set of candidate feature constraints, an objective function with respect to a trend to be analyzed, and a set of record constraints to be applied to a group of records (504). The system can generate the numeric value for each element in the time series by summing respective scores for multiple features or averaging scores for multiple features, for example.

The system 100 generates an alarm when at least one respective numeric value for at least one element in the time series meets a threshold (506). The system 100 can also notify a user when a specific combination of alarms is generated. The threshold can be an absolute threshold or a relative threshold compared to other elements in the time series.

The principles disclosed herein can be used to construct a sophisticated speech analytics system, with several layers of functionality. The lowest layer is a system for speech retrieval and browsing. On top of that, a DBMS provides rudimentary relational analytics. Next, a trend analysis layer adds more sophisticated statistical analyses. Finally, an alerting system collects information from the other layers, and takes the initiative to provide actionable information in a timely manner. The system presents all of the layers to an analyst in an intuitive and integrated GUI.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied in call center analytics as well as any other database of live and/or recorded speech. Those skilled in the art will readily recognize various modifications and changes that may be made to the principles described herein without following the example embodiments and applications illustrated and described herein, and without departing from the spirit and scope of the disclosure.

We claim:

1. A method comprising:
    receiving, as part of a speech trend analysis request, a set of candidate feature constraints, an objective mathematical function with respect to a speech trend to be analyzed, and a set of speech record constraints to be applied to a group of speech records;
    selecting a speech record from the group of speech records based on the set of speech record constraints;
    identifying features in the speech record based on the set of candidate feature constraints, to yield identified features;
    assigning, via a processor, using a statistical regression, a weight to each of the identified features, wherein a scalar value associated with each identified feature is evaluated using the objective mathematical function to yield the weight;

ranking the identified features by respective weights, to yield ranked identified features;
comparing the ranked identified features to a hand-picked set of alarm features, to yield a comparison; and
when the comparison indicates an alarm condition has been met, outputting one of the ranked identified features associated with a speech-based trend in response to the speech as an alarm.

2. The method of claim 1, wherein the group of speech records comprises one of recorded speech, transcriptions, and metadata.

3. The method of claim 1, wherein selecting the speech record from the group of speech records further comprises:
generating a database query command corresponding to the speech record constraints; and
executing the database query command.

4. The method of claim 3, wherein results of executing the database query command are passed to a feature filtering module which identifies the features in the selected speech records, and wherein the results of executing the database query are not output to a user via a display device.

5. The method of claim 1, wherein the set of candidate feature constraints constrains one of transcript features, metadata features, and higher order features inferred from the transcript features and metadata features.

6. The method of claim 1, wherein the objective mathematical function utilizes a combination of features and time.

7. The method of claim 1, wherein the ranked identified features output via a user interface in which a user can focus on records with highly predictive features.

8. The method of claim 1, wherein, after outputting the ranked identified features, a user can revise the speech trend analysis request.

9. The method of claim 8, wherein revising the speech trend analysis request further comprises filtering out an undesired feature constraint from the set of candidate feature constraints.

10. A non-transitory computer-readable storage device having instructions stored which, when executed by a computing device, cause the computing device to perform operations comprising:
receiving, as part of a speech trend analysis request, a set of candidate feature constraints, an objective mathematical function with respect to a speech trend to be analyzed, and a set of speech record constraints to be applied to a group of speech records;
selecting a subset of speech records from the group of speech records based on the set of speech record constraints to yield selected speech records;
identifying features in the selected speech records based on the set of candidate feature constraints to yield identified features;
assigning, via a processor, using a statistical regression, a weight to each of the identified features, wherein a scalar value associated with each identified feature is evaluated using the objective mathematical function to yield the weight;
ranking the identified features by respective weights to yield ranked identified features;
comparing the ranked identified features to a hand-picked set of alarm features, to yield a comparison; and
when the comparison indicates an alarm condition has been met, outputting one of the ranked identified features associated with a speech-based trend in response to the speech as an alarm.

11. The non-transitory computer-readable storage device of claim 10, wherein, after outputting one of the ranked identified features, a user can revise the speech trend analysis request.

12. A system comprising:
a processor; and
a computer-readable storage medium having instructions stored which, when executed by the processor, cause the processor to perform operations comprising:
receiving, as part of a speech trend analysis request, a set of candidate feature constraints selected by an analyst, an objective mathematical function with respect to a speech trend to be analyzed, and a set of speech record constraints to be applied to a group of speech records;
selecting a speech record from the group of speech records based on the set of speech record constraints;
identifying features in the speech record based on the set of candidate feature constraints, to yield identified features;
assigning, via a processor, using a statistical regression, a weight to each of the identified features, wherein a scalar value associated with each identified feature is evaluated using the objective mathematical function to yield the weight;
ranking the identified features by respective weights, to yield ranked identified features;
comparing the ranked identified features to a hand-picked set of alarm features, to yield a comparison; and
when the comparison indicates an alarm condition has been met, outputting one of the ranked identified features associated with a speech-based trend in response to the speech as an alarm.

13. The system of claim 12, wherein the group of speech records comprises one of recorded speech, transcriptions, and metadata.

14. The system of claim 12, wherein selecting the speech record from the group of speech records further comprises:
generating a database query command corresponding to the speech record constraints; and
executing the database query command.

15. The system of claim 14, wherein results of executing the database query command are passed to a feature filtering module which identifies the features in the selected speech records, and wherein the results of executing the database query are not output to a user via a display device.

16. The system of claim 12, wherein the set of candidate feature constraints constrains one of transcript features, metadata features, and higher order features inferred from the transcript features and metadata features.

17. The system of claim 12, wherein the objective mathematical function utilizes a combination of features and time.

18. The system of claim 12, wherein the ranked identified features output via a user interface in which a user can focus on records with highly predictive features.

19. The system of claim 12, wherein, after outputting the ranked identified features, a user can revise the speech trend analysis request.

* * * * *